United States Patent
Hashimoto et al.

[15] 3,694,092
[45] Sept. 26, 1972

[54] PHOTOMETER

[72] Inventors: Hiroshi Hashimoto, Naka-gun; Takehide Satou, Katsuta; Kengo Sudo, Katsuta; Naoya Ono, Katsuta, all of Japan

[73] Assignee: Hitachi, Ltd., Tokyo, Japan

[22] Filed: March 3, 1970

[21] Appl. No.: 16,052

[30] Foreign Application Priority Data

March 7, 1969 Japan ..................44/16860

[52] U.S. Cl. ................356/188, 356/179, 356/185, 356/201, 250/218, 250/226
[51] Int. Cl. ..........................G01j 3/48, G01j 3/46
[58] Field of Search.............356/88, 180, 173, 201; 250/218, 226

[56] References Cited

UNITED STATES PATENTS

| 3,089,382 | 5/1963 | Hecht et al. | 356/188 X |
| 3,459,951 | 8/1969 | Howarth et al. | 356/188 X |
| 3,540,825 | 11/1970 | Grojean | 250/226 X |

*Primary Examiner*—Ronald L. Wibert
*Assistant Examiner*—R. J. Webster
*Attorney*—Craig and Antonelli

[57] ABSTRACT

A photometer which is used to test a sample by the use of two different wavelengths $\lambda_1$ and $\lambda_2$, multiplying the test result of the sample for the wavelengths $\lambda_2$ by a certain coefficient, and subtracting the value obtained by the said multiplication from the test result of the sample for the wavelength $\lambda_1$, thereby quantitatively analyzing the sample.

8 Claims, 5 Drawing Figures

PHOTOMETER

BACKGROUND OF THE INVENTION

1. Field of the Invention

This invention relates to a photometer for optically testing a sample, and more particularly to improvements in a photometer suitable for quantitatively analyzing a sample.

2. Description of the Prior Art

In the field of clinical biochemistry, it is often necessary to quantitatively analyze albumin and bilirubin contained in serum. Therefore, the provision of a photometer which can test these materials with high efficiency and high accuracy would greatly contribute at least to those who are engaged in such field. However, in testing albumin and bilirubin by use of a photometer, the problem that these materials are very difficult to test with accuracy is provided. The difficulty, as will be described later, arises from the fact that the curves representing the spectrum absorbing characteristics of albumin and bilirubin overlap each other and the test result of one of these materials includes an error result due to the presence of the other material.

SUMMARY OF THE INVENTION

It is an object of the present invention to provide a photometer which overcomes the aforementioned problem.

It is another object of the present invention to provide a photometer which is suitable for quantitatively analyzing two different materials with high efficiency and high accuracy even if the spectrum absorbing characteristic curves of the materials overlap each other to a certain degree.

It is still another object of the present invention to provide a photometer which is suitable for quantitatively analyzing three different materials with high efficiency and high accuracy even if the spectrum absorbing characteristic curves of the materials overlap each other to a certain degree.

According to the present invention, a sample is separately tested by the use of two to three different wavelengths. The test results of the sample for the other wavelengths than a particular one of the two to three wavelengths are multiplied by certain coefficients. The values derived by such multiplication are subtracted from the test value of the sample for the said one wavelength. Thus, if the sample contains materials providing two or three substantially overlapping spectrum absorbing characteristic curves, these materials can be quantitatively analyzed.

The above and other objects and features of the present invention will become fully apparent from the following description taken in conjunction with the accompanying drawings.

Figure 1:
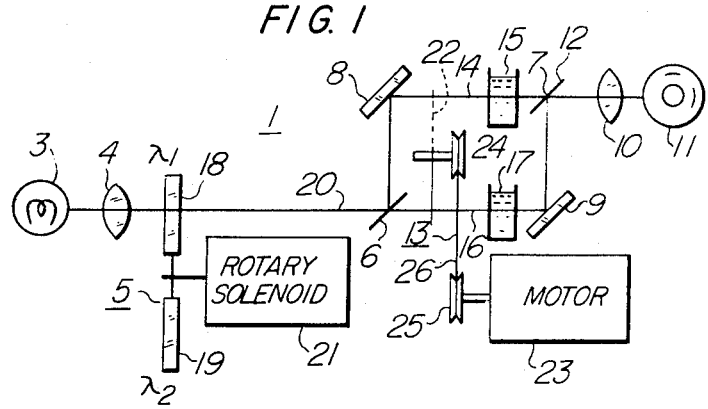
FIG. 1 schematically shows an embodiment of the optical system used in the photometer according to the present invention.
Figure 2:
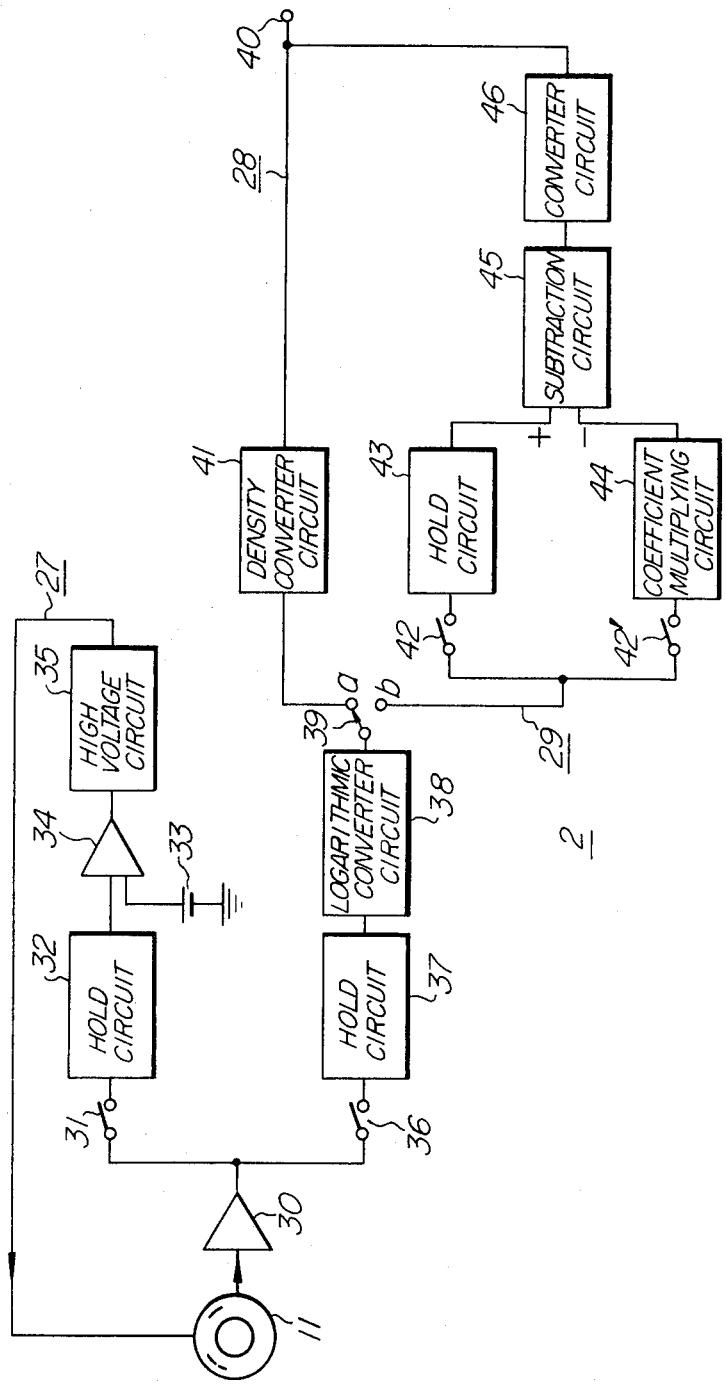
FIG. 2 shows in block diagram an example of the electric circuit system used in the photometer according to the present invention.

DESCRIPTION OF THE PREFERRED EMBODIMENTS:

Referring to FIGS. 1 and 2, there is shown a preferred embodiment of the present invention which includes an optical system 1 as shown in FIG. 1 and an electric circuit system 2 as shown in FIG. 2. The optical system 1 comprises a source of light such as lamp 3, a lens 4 for condensing light from the lamp 3, means 5 for selecting the wavelengths of the light transmitted through the lens 4, a half-mirror 6 through which a half of the light beam from the wavelength selector means 5 is transmitted and by which the remaining half is reflected, a mirror 9 for reflecting the light beam transmitted through the half-mirror 6 to a position 7, a mirror 8 for reflecting the light beam reflected by the half-mirror 6 also to the position 7, a condenser lens 10, a detector 11, a half-mirror 12 disposed at the position 7 for directing the light beam reflected by the mirrors 8 and 9 to the detector 11 through the condenser 10, chopper means 13, a reference sample 15 disposed in a light path 14 leading from the mirror 8 to the half-mirror 12, and a test sample 17 disposed in the light path 16 leading from the half-mirror 6 to the mirror 9. The wavelength selector means 5 comprises two filters 18 and 19 disposed in a common plane and in suitably spaced apart relationship with each other, and a rotary solenoid 21 for selectively introducing either of these filters to a light path 20 leading from the condenser 4 to the half-mirror 6. The filters 18 and 19 transmit the light beam having principal wavelengths $\lambda_1$ and $\lambda_2$ respectively but substantially intercept the light beam having other wavelengths. To select the wavelengths $\lambda_1$ and $\lambda_2$, a defraction grating may be used instead of such filters. The chopper means 13 consists of a chopper 22 for chopping alternately the light beams passing along the light paths 14 and 16 so that these light beams may alternately enter the detector 11, a motor 23, pulleys 24 and 25 connected to the chopper 22 and motor 23 respectively, transmission means 26 such as belt or string stretched on the pulleys 24 and 25.

In operation of the optical system 1, the light from the lamp 3 is led through the condenser lens 4 to the wavelength selector means 5, by which the wavelengths thereof are selected. A wavelength $\lambda_1$ is selected if the filter 18 is brought into the light path 20, while a wavelength $+_2$ is selected if the filter 19 is on the light path 20. The light beam whose wavelengths have been thus selected by the wavelength selector means 5, is led to the half-mirror 6, through which one half of the light beam is transmitted and by which the other half is reflected. That portion of the light beam which has been transmitted through the half-mirror 6 is further passed through the test sample 17 disposed on the light path 16, and is reflected by the mirror 9 and further by the half-mirror 12, then the light beam enters the detector 11 through the condenser lens 10. The other portion of the light beam reflected by the half-mirror 6 is further reflected by the mirror 8 and transmitted through the reference sample 15 disposed on the light path 14, and further passed through the half-mirror 12, then the light beam enters the detector 11 through the condenser lens 10. When the chopper means 5 is driven, the chopper 22 chops alternately the light beams passing along the light paths 14 and 16.

As shown in FIG. 2, the electric circuit system 2 comprises a first circuit 27, a second circuit 28 and a third circuit 29. The first circuit 27 includes an amplifier 30 for amplifying an signal provided by the detector 11, a hold circuit 32 connected to the output terminal of the amplifier 30 through a switch 31, a reference voltage source 33, a comparator-amplifier 34 having two input terminals thereof connected with the output terminal of the hold circuit 32 and the reference voltage source 33, and a high voltage circuit 35 connected with the output terminal of the comparator-amplifier 34. The output signal of the high voltage circuit 35 is fed back to the detector 11 to control the voltage applied to the detector 11.

The second circuit 28 includes a hold circuit 37 connected with the amplifier 30 through a switch 36, a logarithmic converter circuit 38 connected with the output terminal of the hold circuit 37, and a density converter circuit 41 having the input thereof connected with the output terminal of the logarithmic converter circuit 38 through the contact $a$ of a switch 39 and having the output thereof connected with a terminal 40.

The third circuit 29 includes two switches 42, 42' connected with the output of the logarithmic converter circuit 38 through the contact $b$ of the switch 39, a hold circuit 43 and a coefficient multiplying circuit 44 connected with the respective switches 42, 42' a subtraction circuit 45 connected with the outputs of circuits 43 and 44, and a density converter circuit 46 having the input thereof connected also with the terminal 40.

The switches 31 and 36 are operatively interlinked for synchronization with the chopper means 13 so that the switch 31 is closed only when a signal relating to the reference sample 15 (i.e., a signal representing the transmissivity of the reference sample) appears at the output terminal of the detector 11 and that the switch 36 is closed only when a signal relating to the test sample 17 (i.e., a signal representing the transmissivity of this sample) appears at the output terminal of the detector 11. Means for accomplishing such snychronization is known in the art and therefore omitted in FIG. 2.

The switches 42 and 42' are coupled with each other so that one of them is opened when the other one is closed. The wavelength selector means 5 is interlinked with the switches 42 and 42' so that the filter 18 is brought to the light path 20 when the switch 42 is closed and the filter 19 is introduced to the light path 20 when the other switch 42' is closed. Means for accomplishing such interlinkage is also known in the art and therefore omitted herein.

In the operation of the electric circuit system 2, the signal relating to the reference sample 15 (i.e., the signal representing the transmissivity or transmittance thereof) and the signal relating to the test sample 17 (or the signal representing the transmissivity or transmittance thereof) appear alternatively at the output terminal of the detector 11. This is because the light beams transmitted along the light paths 14 and 16 are alternately chopped by the chopper means 13. When the signal relating to the reference sample 15 appears at the output terminal of the detector 11, the switch 31 is closed and the switch 36 is opened, whereby the signal relating to the reference sample 15 is amplified by the amplifier 30 and supplied through the switch 31 to the hold circuit 32, where the signal is held and therefore converted into a d.c. potential signal. This d.c. signal is supplied to the comparator-amplifier 34, which compares this signal with the reference voltage provided by the reference voltage source 33. In accordance with the result of such comparison, the voltage to be applied to the detector 11 is controlled through the high voltage circuit 35 so that the output signal of the detector is made constant. On the other hand, if the signal relating to the test sample 17 appears at the output terminal of the detector 11, the switch 36 is closed and the other switch 31 is opened, whereby this signal is amplified by the amplifier 30 and supplied through the switch 36 to the hold circuit 37, which holds the signal and convert it into a d.c. potential signal. If the density converter circuit 41 is connected with the logarithmic converter circuit 38 by way of the contact $a$ of the switch 39, the aforementioned d.c. potential signal which is the output signal of the hold circuit 37 is applied to the density converter circuit 41; after being converted into a logarithm by the logarithmic converter circuit 38, that is, being converted from the signal representing the transmissivity of the sample 17 into a signal representing the rate of light absorption (i.e., absorbance or extinction), and is there multiplied by a density conversion coefficient so that the signal is converted into a signal representing density or concentration. Such a density representing signal is supplied from the terminal 40 to a display or indicator means such as a recorder or the like (not shown). Thus, the value displayed or indicated by the display or indicator means represents the density of the test sample 17 as compared with that of the reference sample 15.

In the foregoing case, either the filter 18 or the filter 19 may be on the light path 20 to obtain the same result.

If the switches 42, 42' are connected with the logarithmic converter circuit 38 by way of the contact $b$ of the switch 39 and the switch 42 is also closed, the switch 42' is opened and at the same time the filter 18 is brought to the light path 20 so as to select a wavelength $\lambda_1$. Thereupon, a signal relating to the reference sample 15 and a signal relating to the test sample 17 for the wavelength $\lambda_1$ alternately appear at the output terminal of the detector 11. The output signal of the logarithmic converter circuit 38 relating to the test sample 17 for the wavelength $\lambda_1$ is supplied through the switch 42 to the hold circuit 43, which holds the signal.

In this state, if the switch 42' is then closed, the switch 42 is opened and at the same time the filter 19 comes to the light path 20 as to select a wavelength $\lambda_2$. Accordingly, a signal relating to the test sample 17 for the wavelength $\lambda_2$ which appears at the output terminal of the logarithmic converter circuit 38 is supplied through the switch 42' to the coefficient multiplier 44, where the signal is multiplied by a coefficient. The signal relating to the test sample 17 for the wavelength $\lambda_1$ which is the output of the hold circuit 43 (or signal representing the rate of light absorption) and the output signal of the coefficient multiplier 44 are supplied to the subtraction circuit 45 which effects subtraction between the two signals. The output signal of the subtraction circuit 45 is a signal corresponding to the rate of light absorption and this signal is multiplied by a density conversion coefficient in the density converter circuit 46, whereby the signal is converted into a signal representing density. The density representing signal is supplied through the terminal 40 to the display or indicator means such as a recorder or the like.

With the above-described photometer of the present invention, materials whose spectrum absorbing characteristic curves substantially overlap each other can be quantitatively measured with high accuracy and high efficiency. Such a feature of the present invention will now be described with reference to FIG. 3.

Figure 3:
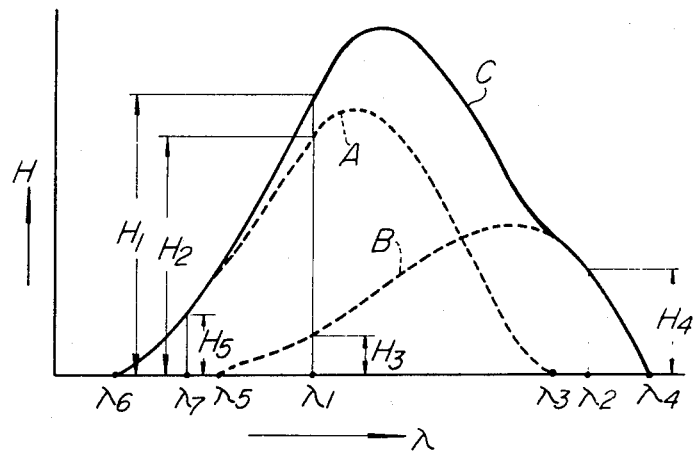
FIG. 3 is a graph for illustrating the spectrum absorbing characteristics of two materials tested by the photometer of FIGS. 1 and 2.

In FIG. 3, the ordinate represents the quantity of light absorbed H, and the abscissa represents the wavelength $\lambda$ of the light. Curves A and B represent the spectrum absorbing characteristics of albumin and bilirubin respectively, the curve C represents the composite spectrum absorbing characteristic of these two materials. As clearly seen in FIG. 3, the two curves A and B substantially overlap each other. Description will now be made of an example of the quantitative analysis carried out on albumin and bilirubin at the wavelength $\lambda_1$ by using the photometer of FIGS. 1 and 2.

As a sample to be tested, an amount of serum containing albumin and bilirubin is disposed at the position 17 in FIG. 1 and the switch 42 is closed so that the filter 18 is brought to the light path 20. Assume that $\lambda_1$ selected by the filter 18 is 540 m$\mu$. Thus, there appears at the output terminal of the logarithmic converter circuit 38 a signal having a quantity of light absorption $H_1$ (FIG. 3) for $\lambda_1$ (= 540 m$\mu$) in the curve C representing the composite spectrum absorbing characteristic of albumin and bilirubin. This signal is held by the hold circuit 43 through the contact $b$ of the switch 39 and the switch 42. Subsequently the switch 42' is closed and the filter 19 is brought to the light path 20. Assume that $\lambda_2$ selected by the filter 19 is 695 m$\mu$, for example, although this $\lambda_2$ is a wavelength longer than $\lambda_3$ but shorter than $\lambda_4$. At this stage, there appears at the output terminal of the logarithmic converter circuit 38 a signal having a quantity of absorption $H_4$ for $\lambda_2$ (= 695 m$\mu$) in the curve B representing the spectrum absorbing characteristic curve of bilirubin. $H_4$ also represents the quantity of absorption for $\lambda_2$ (= 695 m$\mu$) in the curve C representing the composite spectrum absorbing characteristic of albumin and bilirubin. The signal having a magnitude $H_4$ is supplied through the contact $b$ of the switch 39 and the switch 42' to the coefficient multiplying circuit 44, where the signal is multiplied by a coefficient $\alpha$. This means that the output signal of the coefficient multiplying circuit 44 has a magnitude $\alpha H_4$. This $\alpha H_4$ is subtracted from the aforementioned $H_1$ in the subtraction circuit 45. As a result, the magnitude of the output signal provided by the circuit 45 is $H_1 - \alpha H_4$, where $\alpha = H_3/H_4$ and this is a coefficient which is substantially constant regardless of the variation arising in the spectrum absorbing characteristic curve of bilirubin depending on the density thereof. The inventor has empirically verified that this coefficient is substantially always constant. The signal having the magnitude of $H_1 - \alpha H_4$ appearing at the output terminal of the subtraction circuit 45 is multiplied by a coefficient $c$ in the density converter circuit 46. Thus, a signal having a density value of $c(H_1 - \alpha H_4)$ appears at the output terminal of the density converter circuit 46 and this signal is supplied through the terminal 40 to the display or indicator means such as a recorder or the like.

Here, $H_2 = H_1 - H_3 = H_1 - \dfrac{H_3}{H_4} H_4 = H_1 - \alpha H_4$;

accordingly $cH_2 = c)H_1 - \alpha H_4$). Therefore, the magnitude $c(H_1 - \alpha H_4)$ of the signal supplied to the display or indicator means represents nothing other than the density of albumin for $\lambda_1$ (= 540 m$\mu$).

Since $H_1$ and $H_2$ have already been obtained in the foregoing stage, the density of bilirubin for $\lambda_1$ (= 540 m$\mu$) can be derived by substituting $H_1$ and $H_2$ in $H_3 = H_1 - H_2$ to thereby obtain $H_3$ and multiplying $H_3$ by the aforementioned coefficient $c$.

In the above-described example, wavelengths $\lambda_1$ and $\lambda_2$ have been used to obtain $cH_2$ at first, but it is also possible to obtain $cH_3$ at first. In the latter case, a wavelength $\lambda_7$ shorter than $\lambda_5$ but longer than $\lambda_6$ is used instead of the wavelength $\lambda_2$, and a coefficient $\alpha = H_2/H_5$ is used instead of $$\alpha = \dfrac{H_3}{H_4}.$$

In either case, it will be apparent from the foregoing that quantitative analysis of albumin and bilirubin can be effected with high accuracy and excellent efficiency but without any interference caused between the two materials, by utilizing wavelengths overlapping each other in the spectrum absorbing characteristic curves of the two materials.

In FIG. 2, each circuit unit may be of the known type and therefore the detailed illustration thereof has been omitted.

Figure 4:
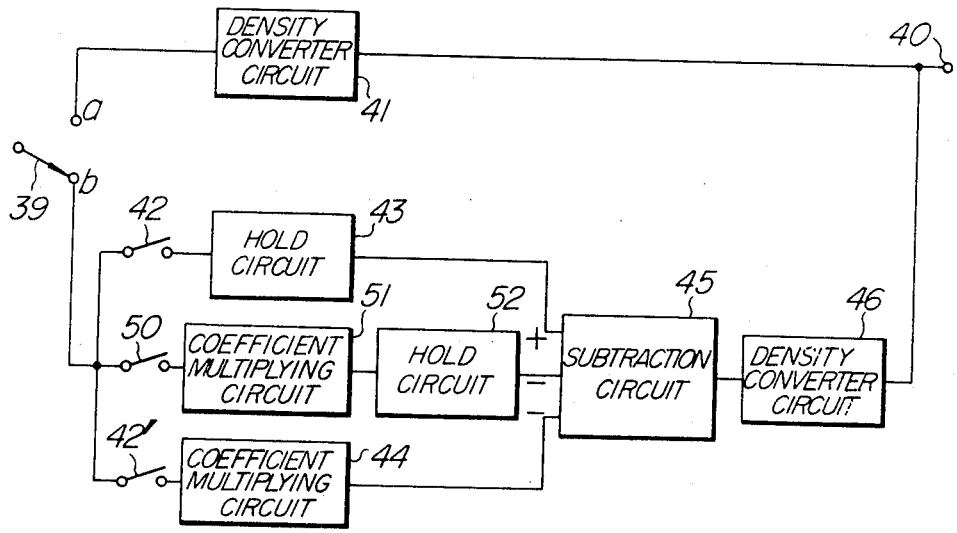
FIG. 4 shows another example of the electric circuit system used in the photometer according to the present invention.

FIG. 4 shows another example of the electric circuit system used in the photometer of the present invention, in which like parts are indicated by like numerals used in FIG. 2. This circuit system is suitable for effecting the quantitative analysis of three different materials providing three different spectrum absorbing characteristics for a wavelength in the range where the three characteristic curves overlap one another. The electric circuit system of FIG. 4 differs from that of FIG. 2 in that it is additionally provided with a switch 50, a coefficient multiplying circuit 51 and a hold circuit 52.

The operation of this circuit system will be explained with reference to FIG. 5.

Figure 5:
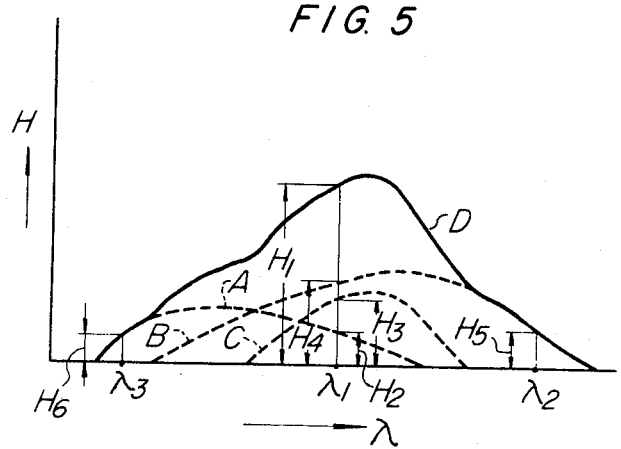
FIG. 5 is a graph for illustrating the spectrum absorbing characteristics of three materials tested by the photometer of FIGS. 1 and 4.

In FIG. 5, curves A, B and C represents the spectrum absorbing characteristics of materials A, B and C. Curve D represents the composite curve of these three curves A, B and C. It is now desired to obtain values of $H_2$, $H_3$ and $H_4$ for a wavelength $\lambda_1$ in the portion thereof where the three curves A, B and C overlap one another. When the switch 42 is first closed so that a wavelength $\lambda_1$ may be selected by the wavelength selector means 5, a signal having a magnitude $H_1$ representing the rate of light absorption is held by the hold circuit 43 as described with respect to FIG. 2. Subsequently, when the switch 50 is closed so that a wavelength $80_2$ may be selected by the wavelength selector means 5, a signal having a magnitude $H_5$ representing the rate of light absorption is supplied to the coefficient multiplying circuit 51, where the signal is multiplied by a coefficient $\alpha_1$ ($\alpha_1 = H_4/H_5$). The output signal $\alpha_1 H_5$ of the coefficient multiplying circuit 51 is held by the hold circuit 52. Finally, when the switch 42' is closed so that a wavelength $\lambda_3$ may be selected by the wavelength selector means 5, a signal having a magnitude $H_6$ representing the rate of light absorption is supplied to the coefficient multiplying circuit 44, where the signal is multiplied by a coefficient $\alpha_2$ ($\alpha_2 = H_2/H_6$). The output signals of the hold circuits 43, 52 and coefficient multiplying circuit 44 having magnitudes $H_1$, $\alpha_1 H_5$ and $\alpha_2 H_6$ respectively are supplied to the subtraction circuit 45, where the signals of magnitudes $\alpha_1 H_5$ and $\alpha_2 H_6$ are subtracted from the signal of magnitude $H_1$. As a result, the magnitude of the output signal appearing at the output terminal of the subtraction circuit 45 is $H_1 - \alpha_1 H_5 - \alpha_2 H_6$.

$$\text{Since } H_3 = H_1 - H_4 - H_2 = H_1 - \frac{H_4}{H_5} H_5 - \frac{H_2}{H_6} H_6$$
$$= H_1 - \alpha_1 H_5 - \alpha_2 H_6,$$

the output signal of the subtraction circuit 45 represents nothing other than the light absorption of the material C for the wavelength $\lambda_1$. The signal having the light absorption $H_3 = H_1 - \alpha_1 H_5 - \alpha_2 H_6$ is converted into a density representing signal by the density converter circuit 46. The magnitude of this density representing signal is given as $c'(H_1 - \alpha_1 H_5 - \alpha_2 H_6)$, here $c'$ representing *the density convertion coefficient*.

Thus, the density of the material C for the wavelength $\lambda_1$ has been obtained and accordingly the density of the materials A and B for the same wavelength $\lambda_1$ can be readily obtained by the respective equations $cH_2 = c(H_1 - H_3 - H_4) = c(H_1 - H_3 - \alpha H_5)$ and $cH_4 = c(H_1 - H_2 - H_3)$.

The selection of wavelengths $\lambda_1$, $\lambda_2$ and $\lambda_3$ by the wavelength selector means 5 may be readily accomplished by providing another filter in addition to the filters 18 and 19.

What is claimed is:

1. In an optical comparison system, a device for quantitatively analyzing a test sample containing first and second materials with respect to a reference sample, each of said first and second materials partially absorbing light rays of a first wavelength, said first material partially absorbing light rays of a second wavelength, said second material being substantially incapable of absorbing the light rays of said second wavelength, said device comprising:
    a. a light source;
    b. first means for directing light rays emitted from said light source to said test sample for transmitting light therethrough;
    c. second means for detecting said light rays transmitted through said sample and for producing first and second electric signals, said first electric signal being proportional to the total transmittance of the light rays of said first wavelength transmitted by said first and second materials, said second electric signal being proportional to the transmittance of the light rays of said second wavelength transmitted by said first material;
    d. third means, disposed at a point on the optical path of said light rays between said light source and said second means, for selecting the wavelength of said light rays transmitted from said light source for permitting substantially only the light rays of said first and second wavelength to be transmitted to said third means;
    e. fourth means responsive to the output of said second means, for converting said first and second electric signals into third and fourth electric signals, respectively, said third electric signal being proportional to the total absorbance of the light rays of said first wavelength transmitted by said first and second materials, said fourth electric signal being proportional to the absorbance of the light rays of said second wavelength transmitted by said first material;
    f. fifth means, responsive to the output of said fourth means, for producing a fifth electric signal representing the product of said fourth electric signal and a constant which is the ratio of the absorbance of the light rays of said first wavelength to that of the light rays of said second wavelength transmitted by said first material;
    g. sixth means, responsive to the outputs of said fourth and fifth means, for producing a sixth electric signal representing the difference between said third electric signal and said fifth electric signal and the product of said difference and a density conversion coefficient; and
    h. seventh means responsive to the output of said sixth means, for utilizing the value of said sixth electric signal.

2. In an optical comparison system, a sample measuring device for quantitatively analyzing a test sample containing first and second materials with respect to a reference sample, each of said first and second materials partially absorbing light rays of a first wavelength, said first material partially absorbing light rays of a second wavelength, said second material being substantially incapable of absorbing the light rays of said second wavelength, said device comprising:
    a. a light source;
    b. a reference sample;
    c. first means for directing light rays emitted from said light source to said test sample and said reference sample for transmitting light therethrough;
    d. second means for detecting said light rays transmitted through said reference and test samples and for producing first, second and third electric signals, said first electric signal being proportional to the total transmittance of the light rays of said first wavelength transmitted by said first and second materials of said test sample, said second electric signal being proportional to the transmittance of the light rays of said second wavelength transmitted by said first material of said test sample, said third electric signal being proportional to the transmittance of the light rays of one of said first and second wavelengths transmitted by said reference sample;
    e. third means disposed at a point on the optical path of said light rays between said light source and said second means for selecting the wavelength of said light rays transmitted from said light source permitting transmission of substantially only the light rays of said first and second wavelength;

f. fourth means, coupled to said second means, for controlling the sensitivity of said second means by comparing said third electric signal with a reference electric signal;

g. fifth means, responsive to the output of said fourth means, for maintaining the controlled sensitivity of said second means substantially constant while said first and second electric signals are selectively produced;

h. sixth means, responsive to the output of said second means, for converting said first and second electric signals into fourth and fifth signals respectively, said fourth electric signal being proportional to the total absorbance of the light rays of said first wavelength transmitted by said first and second materials of said test sample, said fifth electric signal being proportional to the absorbance of the light rays of said second wavelength transmitted by said first material of said test sample;

i. seventh means, responsive to the output of said sixth means for producing a sixth electric signal representing the product of said fifth electric signal and a constant which is the ratio of the absorbance of the light rays of said first wavelength to the absorbance of the light rays of said second wavelength transmitted by said first material of said test sample;

j. eighth means, responsive to the output of said sixth means, for holding said fourth electric signal while said sixth electric signal is produced;

k. ninth means, responsive to the outputs of said seventh and eighth means, for producing a seventh electric signal representing the difference between said fourth and sixth electric signals and the product of said difference and a density conversion coefficient; and l. 10th means, responsive to the output of said ninth means, utilizing the value of said seventh electric signal.

3. An optical sample measuring device according to claim 2, wherein said ninth means comprises:
   means for converting said seventh electric signal into an eighth electric signal representing the concentration of said second material of said test sample; and said 10th means comprises
   means for displaying the value of said eighth electric signal.

4. An optical sample measuring device according to claim 3, wherein said third means includes:
   a first optical filter for transmitting substantially only the light rays of said first wavelength,
   a second optical filter for transmitting substantially only the light rays of said second wavelength, and means for selectively bringing said first and second optical filters to said optical path at a point between said light source and said reference and test samples.

5. In an optical comparison system, a device for quantitatively analyzing a test sample containing first, second and third materials with respect to a reference sample, each of said first, second and third materials partially absorbing a first monochromatic light beam, said first material partially absorbing a second monochromatic light beam, and being substantially incapable of absorbing a third monochromatic light beam, said second material partially absorbing said third monochromatic light beam and being substantially incapable of absorbing said second monochromatic light beam, said third material being substantially incapable of absorbing both of said second and third monochromatic light beams, said device comprising:

a. a light source for generating a beam of light;

b. first means for selectively converting said beam of light into said first, second and third monochromatic light beams which selectively pass along a single light path;

c. second means for selectively directing said first, second and third monochromatic light beams to said test sample over said single light path;

d. third means, disposed in said path, for selectively detecting said first, second and third monochromatic light beams transmitted through said test sample, and selectively producing first, second and third electric signals, said first electric signal being proportional to the total transmittance of said first monochromatic light beam transmitted by said first, second and third materials, said second electric signal being proportional to the transmittance of said second monochromatic light beam transmitted by said first material, and said third electric signal being proportional to the transmittance of said third monochromatic light beam transmitted by said second material;

e. fourth means, responsive to the output of said third means, for converting said first, second and third electric signals into fourth, fifth nd sixth electric signals, said fourth electric signal being proportional to the absorbance of said first monochromatic light beam transmitted said first, second and third materials, said fifth electric signal being proportional to the absorbance of said second monochromatic light beam transmitted by said first material, and said sixth electric signal being proportional to the absorbance of said third monochromatic light beam transmitted by said second material;

f. fifth means, responsive to the output of said fourth means, for producing a seventh electric signal representing the product of said fifth electric signal and a first constant, which is the ratio of the absorbance of said first monochromatic light beam to that of said second monochromatic light beam transmitted by said first material;

g. sixth means, responsive to the output of said fourth means, for producing an eighth electric signal representing the product of said sixth electric signal and a second constant which is the ratio of the absorbance of said first monochromatic light beam to that of said third monochromatic light beam transmitted to said second material;

h. seventh means, responsive to the outputs of said fourth, fifth and sixth means; for subtracting said seventh and eighth electric signals from said fourth electric signal, producing a ninth electric signal representing the result of the subtraction and the product of said difference and a density conversion coefficient, and i. eighth means, responsive to the output of said seventh means, for utilizing the value of said ninth electric signal.

6. In an optical device for quantitatively analyzing a test sample containing first, second and third materials with respect to a reference sample, each of said first, second and third materials partially absorbing a first monochromatic light beam, said first material partially absorbing a second monochromatic light beam and being substantially incapable of absorbing a third monochromatic light beam, said second material partially absorbing said third monochromatic light beam and being substantially incapable of absorbing said second monochromatic light beam, said second material partially absorbing said third monochromatic light beam and being substantially incapable of absorbing said second monochromatic light beam, said third material being substantially incapable of absorbing both of said second and third monochromatic light beams, said device comprising:

a. a light source for generating a beam of light along a single light path
b. a reference sample;
c. first means for selectively converting said beam of light into first, second and third monochromatic light beams;
d. second means, coupled to said first means, for selectively directing said first, second and third monochromatic light beams to said reference and test samples;
e. third means for selectively detecting said first, second and third monochromatic beams transmitted through said reference and test samples and selectively producing first, second, third and fourth electric signals, said first electric signal being proportional to the total transmittance of said first monochromatic light beam transmitted by said first, second and third materials of said test sample, said second electric signal being proportional to the transmittance of said second monochromatic light beam transmitted by said first material of said test sample, said third electric signal being proportional to the transmittance of said third monochromatic light beam transmitted by said second material of said test sample, and said fourth electric signal being proportional to the transmittance of one of said first, second and third monochromatic light beams transmitted by said reference sample;
f. fourth means, coupled to said third means, for controlling the sensitivity of said third means by comparing said fourth electric signal with a reference electric signal;
g. fifth means, coupled to said fourth means, for maintaining the controlled sensitivity of said third means substantially constant while said first, second and third electric signals are selectively produced;
h. sixth means, responsive to the outputs of said third means, for converting said first, second and third electric signals into fifth, sixth and seventh electric signals, said fifth electric signal being proportional to the absorbance of said first monochromatic light beam transmitted by said first, second and third materials of said test sample, said sixth electric signal being proportional to the absorbance of said second monochromatic light beam transmitted by said first material of said test sample, and said seventh electric signal being proportional to the absorbance of said third monochromatic light beam transmitted by said second material of said test sample;
i. seventh means, responsive to the outputs of said sixth means, for producing an eighth electric signal representing the product of said sixth electric signal and a constant which is the ratio of the absorbance of said first monochromatic light beam to that of said second monochromatic light beam transmitted by said first material of said test samples;
j. eighth means, responsive to the output of said sixth means, for producing an ninth electric signal representing the product of said seventh electric signal and another constant which is the ratio of the absorbance of said first monochromatic light beam to that of said third monochromatic light beam transmitted by said second material of said test sample;
k. ninth means, responsive to the output of one of said seventh and eighth means, for holding one of said respective eighth and ninth electric signals while the other signal is produced;
l. 10th means, responsive to the outputs of said sixth, eighth and ninth means for subtracting said eighth and ninth electric signals from said fifth electric signal, producing a 10th electric signal representing the result of the subtraction and the product of said difference and a density conversion coefficient; and
m. 11th means, responsive to the output of said 10th means, for utilizing the value of said tenth electric signal.

7. An optical sample measuring device according to claim 6, wherein said 10th means comprises:
means for converting said ninth electric signal into a further electric signal representing the concentration of said third material; and said eleventh means comprises
means for displaying the value of said further electric signal.

8. An optical sample measuring device according to claim 7, wherein said first means includes first, second and third optical filters for transmitting substantially only said first, second and third monochromatic light beams respectively, and means for selectively bringing said first, second and third optical filters into said single light path.

* * * * *